United States Patent
Johnson

(10) Patent No.: US 10,753,621 B2
(45) Date of Patent: Aug. 25, 2020

(54) OVEN APPLIANCE WITH A SENSOR SHIELD

(71) Applicant: Haier US Appliance Solutions, Inc., Wilmington, DE (US)

(72) Inventor: Eric Scott Johnson, Louisville, KY (US)

(73) Assignee: Haier US Applicance Solutions, Inc., Wilmington, DE (US)

( * ) Notice: Subject to any disclaimer, the term of this patent is extended or adjusted under 35 U.S.C. 154(b) by 288 days.

(21) Appl. No.: 15/859,804

(22) Filed: Jan. 2, 2018

(65) Prior Publication Data

US 2019/0203951 A1    Jul. 4, 2019

(51) Int. Cl.
| | |
|---|---|
| *F24C 15/36* | (2006.01) |
| *G01K 13/00* | (2006.01) |
| *G01K 1/08* | (2006.01) |
| *F24C 7/08* | (2006.01) |
| *F24C 7/06* | (2006.01) |

(52) U.S. Cl.
CPC .............. *F24C 15/36* (2013.01); *F24C 7/067* (2013.01); *F24C 7/085* (2013.01); *G01K 1/08* (2013.01); *G01K 13/00* (2013.01); *G01K 2207/00* (2013.01); *G01K 2207/06* (2013.01)

(58) Field of Classification Search
CPC .......... F24C 15/36; F24C 7/067; F24C 7/085; G01K 1/08; G01K 13/00
See application file for complete search history.

(56) References Cited

U.S. PATENT DOCUMENTS

| | | | |
|---|---|---|---|
| 2,931,575 A | 4/1960 | Reeves et al. | |
| 4,357,522 A | 11/1982 | Husslein et al. | |
| 5,967,661 A * | 10/1999 | Renken | G01K 15/00 374/126 |
| 2013/0308678 A1* | 11/2013 | Bach | G01K 13/02 374/142 |
| 2016/0116171 A1* | 4/2016 | Johnson | A23L 5/15 426/523 |

FOREIGN PATENT DOCUMENTS

| | | |
|---|---|---|
| DE | 3442848 C2 | 2/1987 |
| DE | 19505588 A1 | 8/1996 |

OTHER PUBLICATIONS

Machine Translation of DE 19505588 from epo.org.*

* cited by examiner

*Primary Examiner* — Jeremy Carroll
(74) *Attorney, Agent, or Firm* — Dority & Manning, P.A.

(57) ABSTRACT

An oven appliance includes a sensor that is positioned coplanar with a broil heating element in a plane that is perpendicular to a vertical direction. The sensor is also positioned at a center portion of the broil heating element and/or between terminal ends of the broil heating element along a lateral direction that is perpendicular the vertical direction. A sensor shield is positioned between the broil heating element and the sensor in the plane that is perpendicular to the vertical direction.

13 Claims, 4 Drawing Sheets

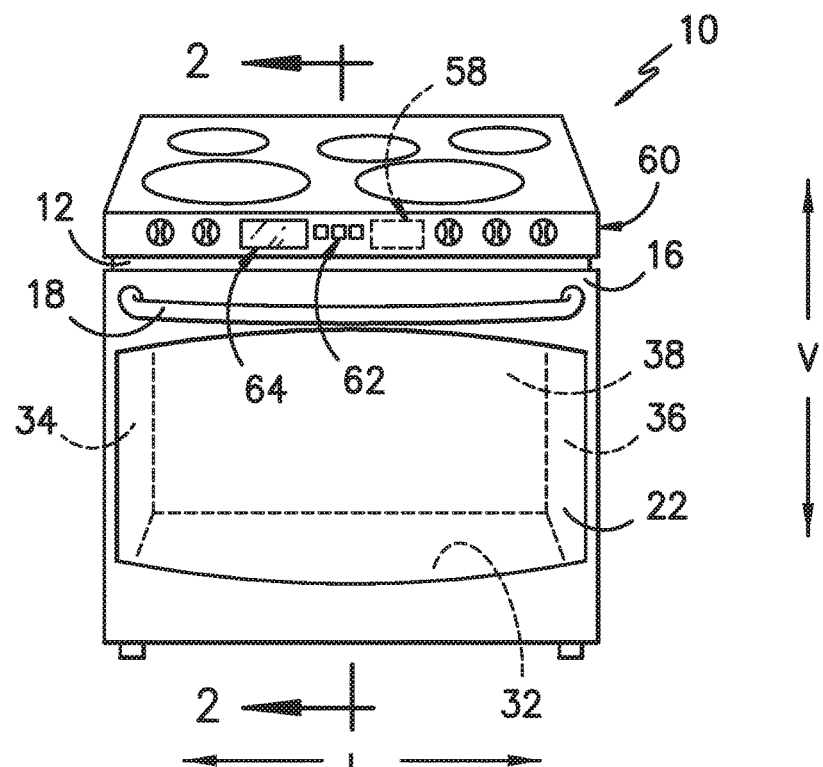
FIG. -1-
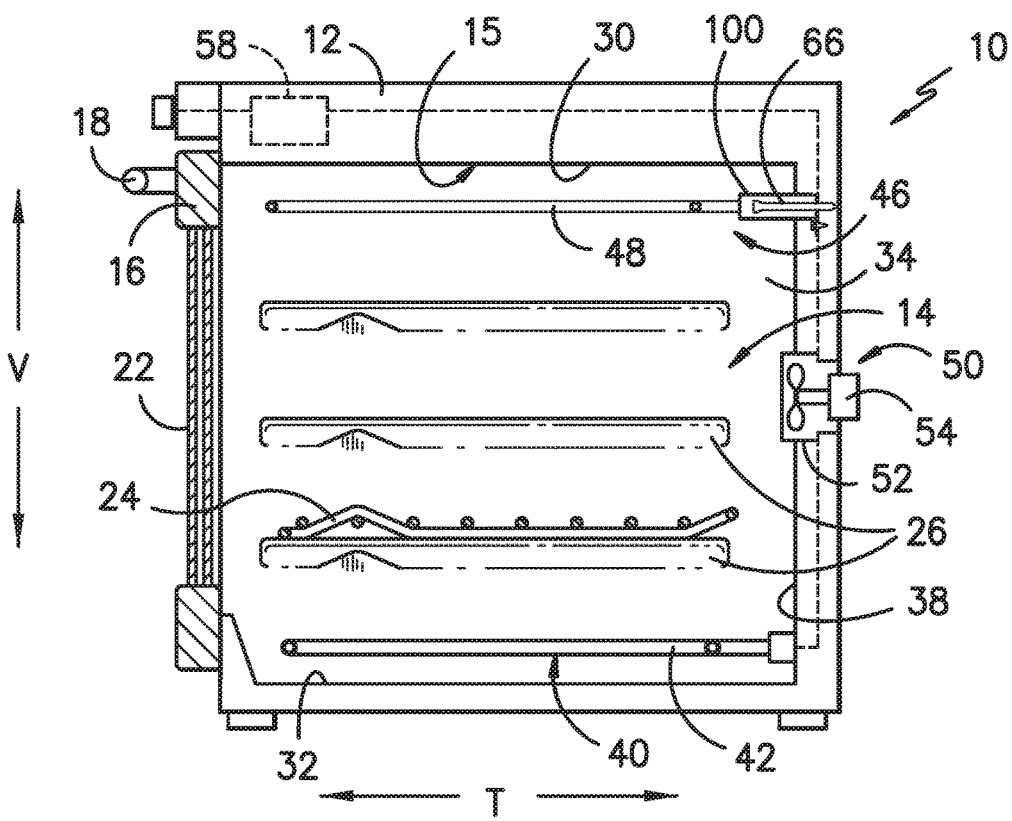
FIG. -2-

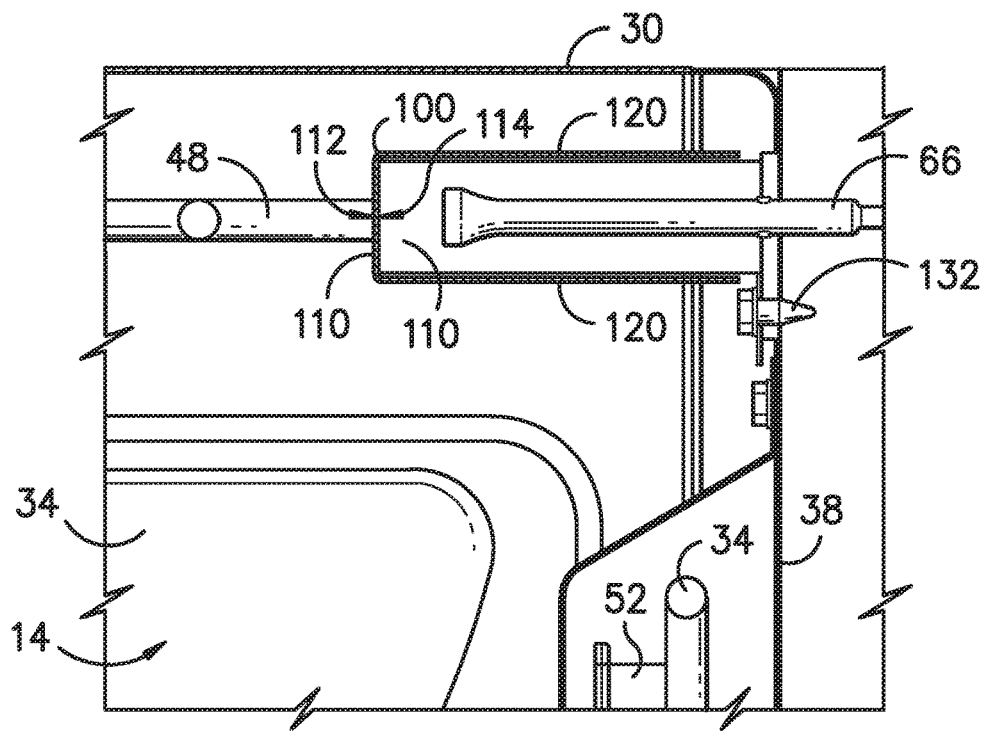
FIG. -3-
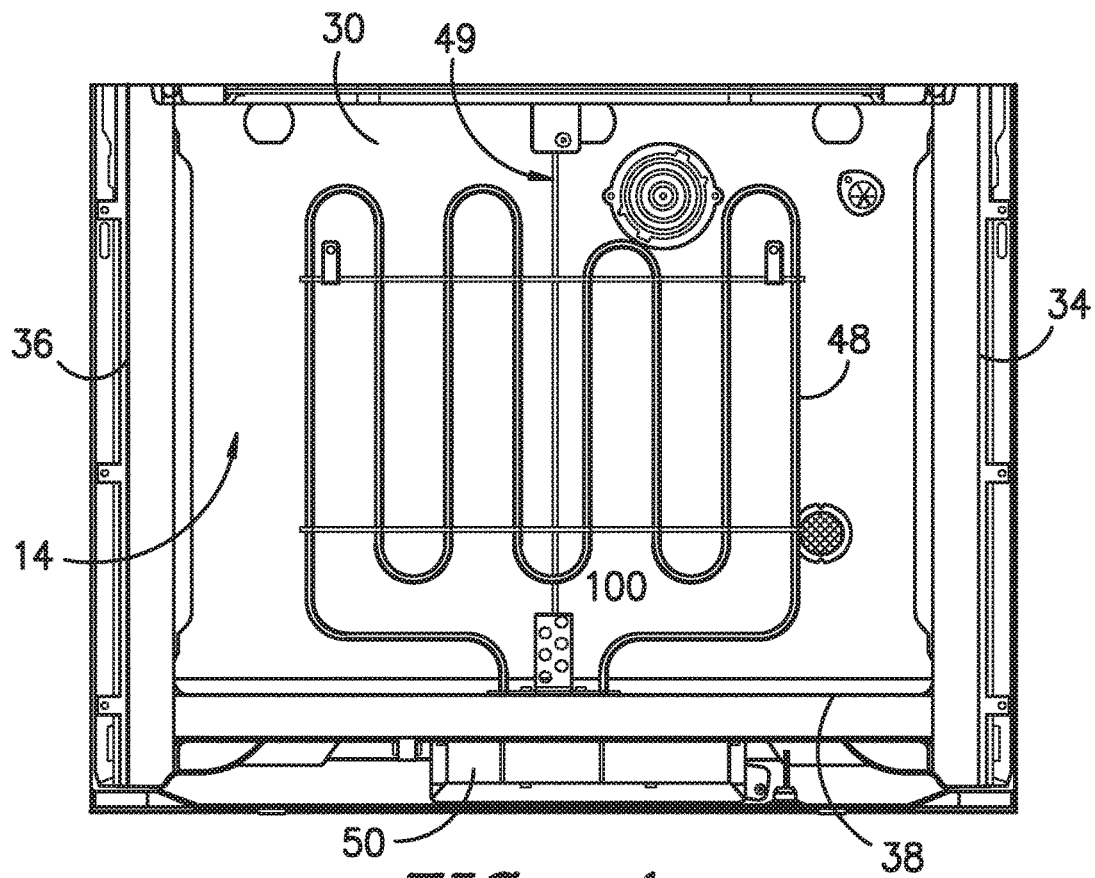
FIG. -4-

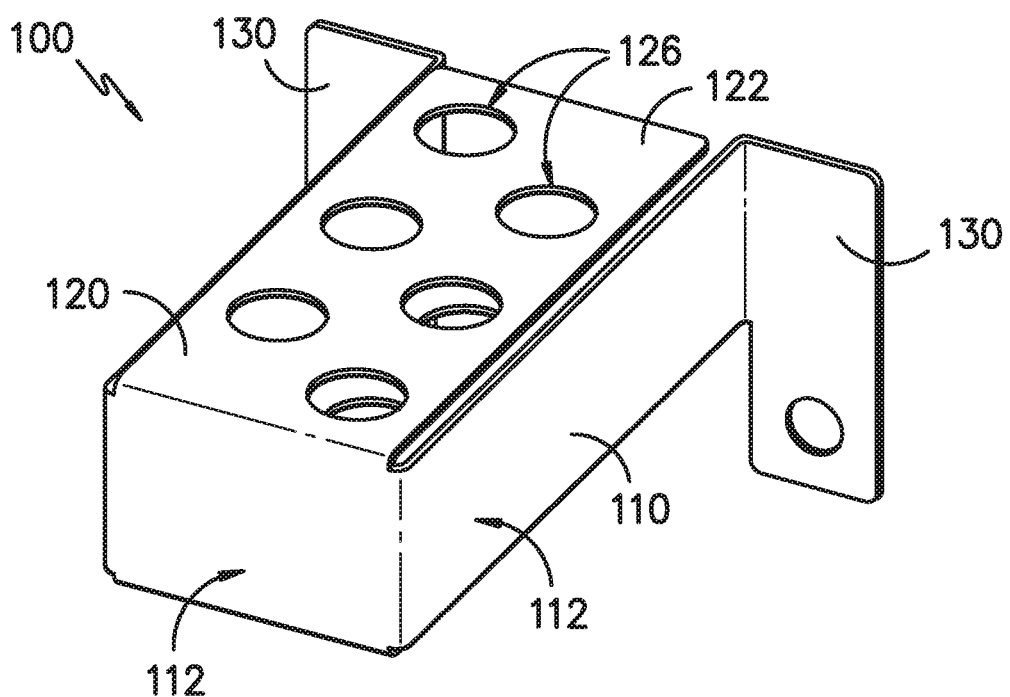
FIG. -5-
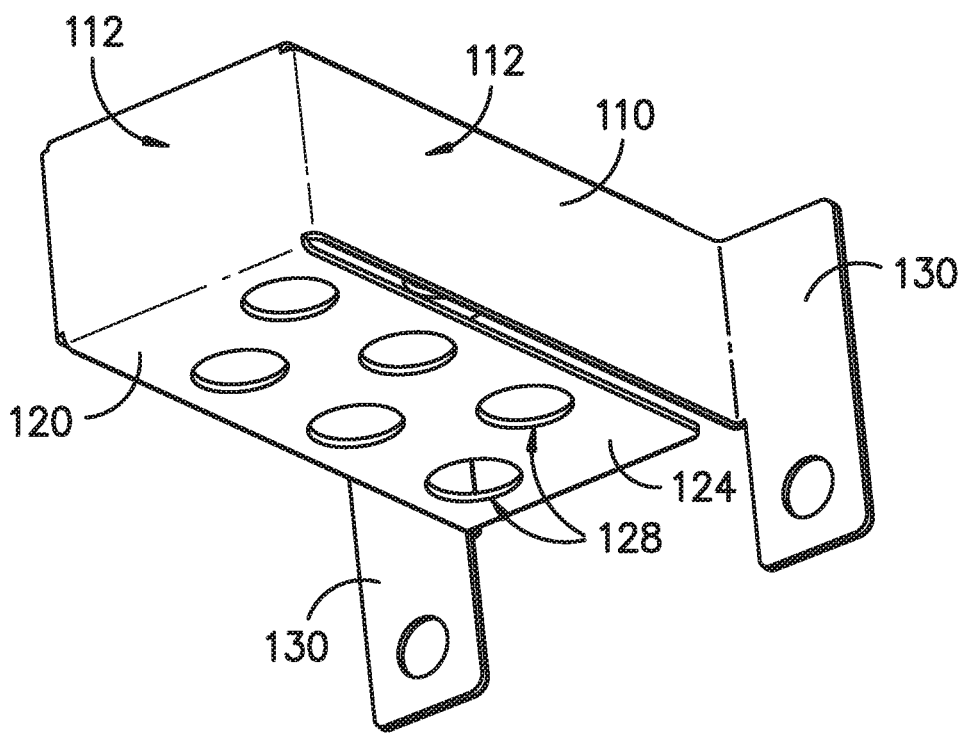
FIG. -6-

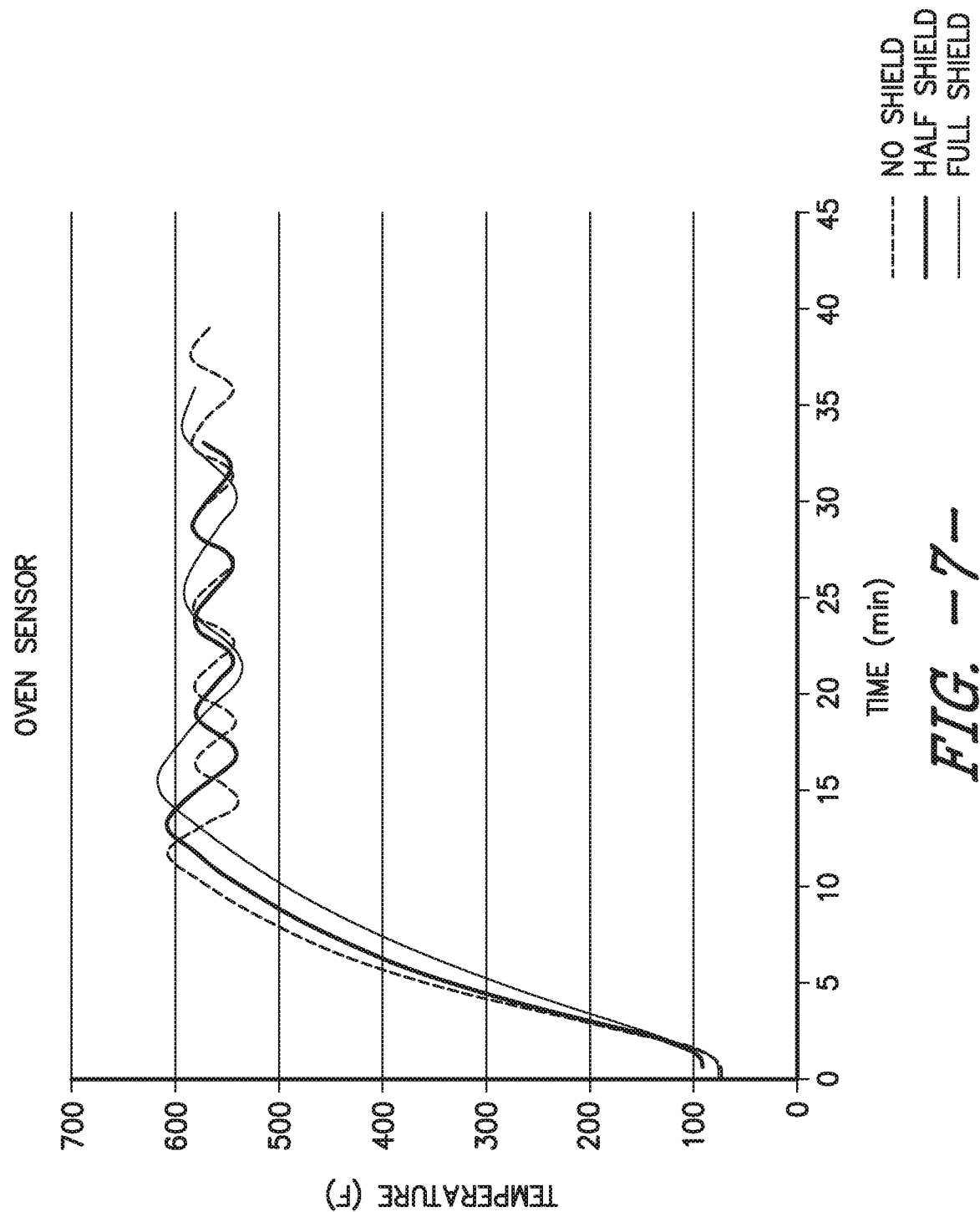

OVEN APPLIANCE WITH A SENSOR SHIELD

FIELD OF THE INVENTION

The present subject matter relates generally to oven appliance with sensors, such as temperature sensors or humidity sensors.

BACKGROUND OF THE INVENTION

Oven appliances generally include a cabinet that defines a cooking chamber and heating elements that operate to keep the cooking chamber at a set temperature. A user may place a food item within the cooking chamber to cook the food item at the set temperature. Certain oven appliances include a temperature sensor within the cooking chamber. Operation of the heating element is controlled in response to measurements from the temperature sensor.

In certain oven appliances, the temperature sensor is located near a top wall of the cooking chamber, and a broil heater can bias the temperature sensor and reduce broil performance of such oven appliances. Thus, an oven appliance with features for improving broil performance of the oven appliance would be useful.

BRIEF DESCRIPTION OF THE INVENTION

The present subject matter provides an oven appliance. The oven appliance includes a sensor that is positioned coplanar with a broil heating element in a plane that is perpendicular to a vertical direction. The sensor is also positioned at a center portion of the broil heating element and/or between terminal ends of the broil heating element along a lateral direction that is perpendicular the vertical direction. A sensor shield is positioned between the broil heating element and the sensor in the plane that is perpendicular to the vertical direction. Additional aspects and advantages of the invention will be set forth in part in the following description, or may be apparent from the description, or may be learned through practice of the invention.

In a first example embodiment, a cabinet defines a cooking chamber. The cooking chamber extends between a top portion and a bottom portion along a vertical direction. A broil heating element is positioned at a top portion of the cooking chamber. A temperature sensor is positioned coplanar with the broil heating element in a plane that is perpendicular to the vertical direction. The temperature sensor is also positioned at a center portion of the broil heating element along a lateral direction that is perpendicular the vertical direction. A temperature sensor shield is positioned between the broil heating element and the temperature sensor in the plane that is perpendicular to the vertical direction.

In a second example embodiment, a cabinet defines a cooking chamber. The cooking chamber extends between a top portion and a bottom portion along a vertical direction. A broil heating element is positioned at a top portion of the cooking chamber. A sensor is positioned coplanar with the broil heating element in a plane that is perpendicular to the vertical direction. The sensor is also positioned between terminal ends of the broil heating element along a lateral direction that is perpendicular the vertical direction. A sensor shield is positioned between the broil heating element and the sensor in the plane that is perpendicular to the vertical direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of an oven appliance according to an example embodiment of the present subject matter.

FIG. 2 provides a sectional view of the example oven appliance of FIG. 1 taken along the line 2-2 of FIG. 1.

FIG. 3 is a portion of the sectional view of FIG. 2 that shows a temperature sensor and temperature sensor shield of the example oven appliance.

FIG. 4 is a bottom, plan view of a cooking chamber of the example oven appliance of FIG. 1.

FIG. 5 is a top, perspective view of the temperature sensor shield of FIGS. 3 and 4.

FIG. 6 is a bottom, perspective view of the temperature sensor shield of FIGS. 3 and 4.

FIG. 7 is a plot of time versus measured temperature with a temperature sensor under various shielding conditions.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1 and 2 depict an example oven appliance 10 that may be configured in accordance with aspects of the present disclosure. For the particular embodiment of FIGS. 1 and 2, oven appliance 10 defines a vertical direction V, a lateral direction L and a transverse direction T. The vertical, lateral and transverse directions are mutually perpendicular and form an orthogonal direction system. As will be understood by those skilled in the art, oven appliance 10 is provided by way of example only, and the present subject matter may be used in any suitable oven appliance, such as a double oven range, a single wall oven, a double wall oven, etc. Thus, it should be appreciated that the invention is not limited to any particular style, model, or configuration of oven appliance 10.

Oven appliance 10 includes an insulated cabinet 12 with an interior cooking chamber 14 defined by an interior surface 15 of cabinet 12. Cooking chamber 14 extends between a top portion 17 and a bottom portion 19 along the vertical direction V. Cooking chamber 14 is configured for the receipt of one or more food items to be cooked. A door 16 is rotatably mounted to cabinet 12, e.g., with a hinge (not shown), and a handle 18 is mounted to door 16 to assist a user with opening and closing door 16 while accessing cooking chamber 14. For example, a user can pull on handle 18 to open or close door 16 and access cooking chamber 14.

Oven appliance 10 can include a seal (not shown) between door 16 and cabinet 12 that assists with maintaining heat and cooking fumes within cooking chamber 14 when door 16 is closed as shown in FIG. 2. Multiple parallel glass panes 22 provide for viewing the contents of cooking chamber 14 when door 16 is closed and assist with insulating cooking chamber 14. A baking rack 24 is positioned in cooking chamber 14 for the receipt of food items or utensils containing food items. Baking rack 24 is slidably received onto embossed ribs 26 or sliding rails such that rack 24 may be conveniently moved into and out of cooking chamber 14 when door 16 is open.

As shown, various sidewalls define the cooking chamber 14. For example, cooking chamber 14 includes a top wall 30 and a bottom wall 32 which are spaced apart along the vertical direction V. Top wall 30 may be positioned at top portion 17 of cooking chamber 14, and bottom wall 32 may be positioned at bottom portion 19 of cooking chamber 14. Left sidewall 34 and right sidewall 36 (as defined according to the view as shown in FIG. 1) extend between the top wall 30 and bottom wall 32, and are spaced apart along the lateral direction L. A rear wall 38 may additionally extend between the top wall 30 and bottom wall 32 as well as between the left sidewall 34 and right sidewall 36, and is spaced apart from the door 16 along the transverse direction T. Cooking chamber 14 is thus defined between the top wall 30, bottom wall 32, left sidewall 34, right sidewall 36, and rear wall 38.

A lower heating assembly, e.g., bake heating assembly 40, may be included in oven appliance 10, and may include one or more heating elements, e.g. bake heating element 42. Bake heating element 42 may be disposed within the cooking chamber 14, such as at bottom portion 19 of cooking chamber 14 and/or adjacent bottom wall 32. In exemplary embodiments as illustrated, the bake heating element 42 is an electric heating element, as is generally understood. Alternatively, the bake heating element 42 may be a gas burner or other suitable heating element having other suitable heating sources. Bake heating element 42 may generally be used to heat cooking chamber 14 for both cooking and cleaning of oven appliance 10.

Additionally, an upper heating assembly, e.g., broil heating assembly 46, may be included in oven appliance 10, and may include one or more upper heating elements, e.g., broil heating element 48. Broil heating element 48 may be disposed within the cooking chamber 14, such as at top portion 17 of cooking chamber 14 and/or adjacent top wall 30. In exemplary embodiments as illustrated, the broil heating element 48 is an electric heating element, as is generally understood. Alternatively, the broil heating element 48 may be a gas burner or other suitable heating elements having other suitable heating sources. Broil heating element 48 may additionally generally be used to heat cooking chamber 14 for both cooking and cleaning of oven appliance 10.

Oven appliance 10 may also include a convection heating assembly 50. Convection heating assembly 50 may have a fan 52 and a convection heating element 54. Convection heating assembly 50 is configured for selectively urging a flow of heated air into cooking chamber 14. For example, fan 52 can pull air from cooking chamber 14 into convection heating assembly 50 and convection heating element 54 can heat such air. Subsequently, fan 52 can urge such heated air back into cooking chamber 14. As another example, fan 52 can cycle heated air from cooking chamber 14 within cooking chamber 14 in order to generate forced convective air currents without use of convection heating element 54. Like heating elements 42, 48 discussed above, convection heating element 54 may be, e.g., a gas burner, an electric heating element or suitable combination thereof.

Oven appliance 10 is further equipped with a controller 58 to regulate operation of the oven appliance 10. For example, controller 58 may regulate the operation of various components of oven appliance 10, such as heating elements 42, 48, 54 (and heating assemblies 40, 46, 50 generally). Controller 58 may be in communication with the heating elements 42, 48, 54 and other suitable components of the oven appliance 10, as discussed herein. In general, controller 58 may be operable to configure the oven appliance 10 (and various components thereof) for cooking. Such configuration may be based on a plurality of cooking factors of a selected operating cycle.

By way of example, controller 58 may include one or more memory devices and one or more microprocessors, such as general or special purpose microprocessors operable to execute programming instructions or micro-control code associated with an operating cycle. The memory may represent random access memory such as DRAM, or read only memory such as ROM or FLASH. In one embodiment, the processor executes programming instructions stored in memory. The memory may be a separate component from the processor or may be included onboard within the processor.

Controller 58 may be positioned in a variety of locations throughout oven appliance 10. In the illustrated embodiment, controller 58 may be located within a user interface panel 60 of oven appliance 10 as shown in FIGS. 1 and 2. In such an embodiment, input/output ("I/O") signals may be routed between the control system and various operational components of oven appliance 10 along wiring harnesses that may be routed through cabinet 12. Typically, controller 58 is in communication with user interface panel 60 and controls 62 through which a user may select various operational features and modes and monitor progress of oven appliance 10. In one embodiment, user interface 60 may represent a general purpose I/O ("GPIO") device or functional block. In one embodiment, user interface 60 may include input components, such as one or more of a variety of electrical, mechanical or electro-mechanical input devices including rotary dials, push buttons, and touch pads. User interface 60 may include a display component, such as a digital or analog display device 64 designed to provide operational feedback to a user.

User interface 60 may be in communication with controller 58 via one or more signal lines or shared communication busses. Controller 58 may also be communication with one or more sensors, e.g., a temperature sensor 66 that is used to measure temperature inside cooking chamber 14 and provide such measurements to controller 58. In this manner, controller 58 may operate heating elements 42, 48, 54 in response to user manipulation of user interface panel 60. Controller 58 can also receive temperature measurements from temperature sensor 66 placed within cooking chamber 14 and e.g., provide a temperature indication to the user with display 64. Temperature sensor 66 may be a thermocouple or a thermistor in certain example embodiments.

Temperature sensor 66 is shown (in FIG. 2) in the top and rear of cooking chamber 14. Thus, temperature sensor 66 is positioned at or adjacent broil heating element 48, as discussed in greater detail below. Oven appliance 10 also includes features for reducing radiant heat transfer between broil heating element 48 and temperature sensor 66. In particular, oven appliance 10 includes a temperature sensor shield 100 that reduces and/or blocks radiant heating of temperature sensor 66 by broil heating element 48.

FIG. 3 is a portion of FIG. 2 that shows temperature sensor 66 and temperature sensor shield 100 of oven appliance 10. FIG. 4 is a bottom, plan view of cooking chamber 14 that shows broil heating element 48 and temperature sensor shield 100. As may be seen in FIGS. 2 and 3, temperature sensor 66 is positioned coplanar with the broil heating element 48, e.g., in a plane that is perpendicular to the vertical direction V. In addition, as shown in FIG. 4, temperature sensor 66 is positioned at a center portion 49 of broil heating element 48, e.g., along the lateral direction L. Thus, temperature sensor 66 may be about equidistant from opposite sides of broil heating element 48 and/or left and right sidewalls 34, 36 along the lateral direction L. As used herein, the term "about" means within six inches of the stated lateral distance when used in the context of the location temperature sensor 66 relative to broil heating element 48 along the lateral direction L. In certain example embodiments, as shown in FIG. 4, temperature sensor 66 may be positioned between terminal ends of broil heating element 48 at rear wall 38. In particular, temperature sensor 66 may extend from rear wall 38 into cooking chamber 14 along the transverse direction T between terminal ends of broil heating element 48. In such example embodiments, temperature sensor 66 may be positioned between terminal ends of broil heating element 48 at rear wall 38 adjacent one of left and right sidewalls 34, 36 rather than equidistant from left and right sidewalls 34, 36.

Turning back to FIG. 3, temperature sensor shield 100 is positioned between broil heating element 48 and temperature sensor 66 in the plane that is perpendicular to the vertical direction V. Thus, temperature sensor shield 100 may reduce and/or block radiant heating of temperature sensor 66 by broil heating element 48. In particular, temperature sensor shield 100 may be positioned between broil heating element 48 and temperature sensor 66 along the lateral direction L and transverse direction T in order to reduce and/or block radiant heating of temperature sensor 66 by broil heating element 48 along the lateral direction L and transverse direction T. In such a manner, temperature sensor shield 100 reduces the rate at which temperature sensor 66 is heated by broil heating element 48 and thereby improve broil performance of oven appliance 10.

FIG. 5 is a top, perspective view of temperature sensor shield 100, and FIG. 6 is a bottom, perspective view of temperature sensor shield 100. As shown in FIGS. 5 and 6, temperature sensor shield 100 may include a side wall 110. Side wall 110 may be shaped and positioned such that an outer surface 112 of side wall 110 faces broil heating element 48, e.g., along the lateral direction L and transverse direction T. In contrast, an inner surface 114 of side wall 112 may face temperature sensor 66. Thus, e.g., one surface of side wall 110 may face broil heating element 48 while an opposite surface of side wall 110 may face temperature sensor 66.

As may be seen from the above, side wall 110 may block the line of sight from broil heating element 48 to temperature sensor 66. Although shown with planar outer surfaces 112 in FIGS. 5 and 6, outer surface 112 may also be curved to block the line of sight from broil heating element 48 to temperature sensor 66 in alternative example embodiments. Side wall 112 may also be shaped complementary to temperature sensor 66. Thus, e.g., side wall 112 may be U-shaped in the plane that is perpendicular to the vertical direction V.

Side wall 110 may be imperforate to facilitate reduction and/or blocking of radiant heating of temperature sensor 66 by broil heating element 48. Thus, side wall 110 may have no holes (or minimum holes) for allowing radiant heating of temperature sensor 66 by broil heating element 48 to pass through side wall 110. In contrast, temperature sensor shield 100 may also include a pair of perforated walls 120. Perforated walls 120 may be positioned above and below temperature sensor 66 along the vertical direction V. In particular, perforated walls 120 may include an upper perforated wall 122 and a lower perforated wall 124. Upper perforated wall 122 is positioned above temperature sensor 66 along the vertical direction V, and lower perforated wall 124 is positioned below temperature sensor 66 along the vertical direction V. Holes 126 in upper perforated wall 122 and holes 128 in lower perforated wall 124 may allow air from cooking chamber 14 to flow through temperature sensor shield 100 and across temperature probe 66. Thus, temperature probe 66 may accurately measure the temperature of air within cooking chamber 14 while avoiding direct radiant heating of temperature sensor 66 by broil heating element 48.

Temperature sensor shield 100 may be spaced from temperature sensor 66. For example, inner surface 114 of side wall 112 may be spaced from temperature sensor 66, e.g., along the lateral direction L and the transverse direction T. In such a manner, conductive heat transfer between temperature sensor shield 100 and temperature sensor 66 may be reduced or eliminated. In addition, outer surfaces of temperature sensor shield 100 may be reflective and/or temperature sensor shield 100 may be insulated to further reduce heat transfer to temperature sensor 66. For example, outer surface 112 of side wall 110 may be aluminized, e.g., in order to increase reflectivity of outer surface 112 of side wall 110 relative to an uncoated outer surface 112 and thereby reduce radiant heat transfer between broil heating element 48 and temperature sensor shield 100. As another example, insulation (such as fiberglass or foil insulation) may be mounted on inner surface 114 of side wall 112 to reduce heat transfer between temperature sensor shield 100 and temperature sensor 66.

Temperature sensor shield 100 may be mounted to rear wall 38. For example, temperature sensor shield 100 may include flanges 130 mounted to side wall 112 and/or perforated walls 120 at rear wall 38, and fasteners 132 may extend through flanges 130 into rear wall 38 in order to mount temperature sensor shield 100 to rear wall 38. Temperature sensor shield 100 may be formed by cutting and bending a piece of sheet metal. For example, a single piece of sheet metal may be cut to form side wall 110, perforated walls 120 and flanges 130, and such components may then be bent into the shape shown in FIGS. 5 and 6.

FIG. 7 is a plot of time versus measured temperature with temperature sensor 66 under various shielding conditions during operation of oven appliance 10 in a broil heating mode, i.e., when broil heating element 48 is operating to heat cooking chamber 14. The various shielding conditions include: (1) a dashed line that corresponds to oven appliance 10 without temperature sensor shield 100 such that temperature sensor 66 is unshielded; (2) a light solid line that corresponds to oven appliance 10 with temperature sensor shield 100 having side wall 112 but not perforated walls 120 such that temperature sensor 66 is half-shielded; and (3) a heavy solid line that corresponds to oven appliance 10 with temperature sensor shield 100 having side wall 112 and perforated walls 120 such that temperature sensor 66 is full-shielded. As shown in FIG. 7, the half-shielded temperature sensor 66 may increase heating time with broil heating element 48 by about one and eight-tenths (1.8) minute relative to the unshielded temperature sensor 66, and the full-shielded temperature sensor 66 may increase heating time with broil heating element 48 by about three and one-half (3.5) minutes relative to the unshielded temperature sensor 66.

Broil heating element 48 delivers intense radiant heat to cooking chamber and food items therein during the broil heating mode, and temperature sensor 66 is positioned near broil heating element 48. When oven appliance 10 is in the broil heating mode, controller 58 may compare temperature measurements from temperature sensor 66 a first threshold value, $T_{off}$, and a second threshold value, $T_{on}$. The first threshold value $T_{off}$ is greater than the second threshold value $T_{on}$. During the broil heating mode, controller 58 may deactivate broil heating element 48 when the temperature measurements from temperature sensor 66 exceed first threshold value $T_{off}$, and controller 58 may activate broil heating element 48 when the temperature measurements from temperature sensor 66 fall below second threshold value $T_{on}$.

Performance of the oven appliance 10 during the broil heating mode can be dependent upon the intensity of heat from broil heating element 48 and the duration which broil heating element 48 is activated. Longer broil heating element 48 on-times during the broil heating mode yield higher performance. By delaying heat transfer from broil heating element 48 to temperature sensor 66, temperature sensor shield 100 allows broil heating element 48 to remain on for a longer time, as shown in FIG. 7.

It will be understood that while described above in the context of temperature sensor 66, sensor shield 100 may also be used with other suitable sensors, such as a humidity sensor, to limit direct heating of such sensors, in alternative example embodiments. In addition, temperature sensor 66 and temperature sensor shield 100 may also be positioned bake heating element 42 or convection heating assembly 50 to provide similar benefits.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance, comprising:
   a cabinet defining a cooking chamber, the cooking chamber extending between a top portion and a bottom portion along a vertical direction;
   a broil heating element positioned at a top portion of the cooking chamber;
   a temperature sensor positioned coplanar with the broil heating element in a plane that is perpendicular to the vertical direction, the temperature sensor also positioned at a center portion of the broil heating element along a lateral direction that is perpendicular the vertical direction; and
   a temperature sensor shield positioned between the broil heating element and the temperature sensor in the plane that is perpendicular to the vertical direction, the temperature sensor shield comprising an imperforate wall and a perforated wall, an outer surface of the imperforate wall facing the broil heating element, an inner surface of the imperforate wall facing the temperature sensor, the perforated wall positioned above or below the temperature sensor along the vertical direction,
   wherein the imperforate wall is U-shaped in the plane that is perpendicular to the vertical direction.

2. The oven appliance of claim 1, wherein the perforated wall is an upper perforated wall and is positioned above the temperature sensor along the vertical direction, the temperature sensor shield further comprising a lower perforated wall and is positioned below the temperature sensor along the vertical direction.

3. The oven appliance of claim 1, wherein the imperforate wall and the perforated wall are formed from a piece of sheet metal.

4. The oven appliance of claim 1, wherein the outer surface of the imperforate wall is aluminized.

5. The oven appliance of claim 1, wherein the broil heating element, the temperature sensor and the temperature sensor shield are mounted to a rear wall of the cooking chamber.

6. The oven appliance of claim 1, wherein the temperature sensor shield comprises a side wall, an outer surface of the side wall facing the broil heating element, an inner surface of the side wall facing the temperature sensor.

7. An oven appliance, comprising:
   a cabinet defining a cooking chamber, the cooking chamber extending between a top portion and a bottom portion along a vertical direction;
   a broil heating element positioned at a top portion of the cooking chamber;
   a sensor positioned coplanar with the broil heating element in a plane that is perpendicular to the vertical direction, the sensor also positioned between terminal ends of the broil heating element along a lateral direction that is perpendicular the vertical direction; and
   a sensor shield positioned between the broil heating element and the sensor in the plane that is perpendicular to the vertical direction, the sensor shield comprising an imperforate wall and a perforated wall, an outer surface of the imperforate wall facing the broil heating element, an inner surface of the imperforate wall facing the sensor, the perforated wall positioned above or below the sensor along the vertical direction,
   wherein the imperforate wall is U-shaped in the plane that is perpendicular to the vertical direction.

8. The oven appliance of claim 7, wherein the perforated wall is an upper perforated wall and is positioned above the sensor along the vertical direction, the sensor shield further comprising a lower perforated wall and is positioned below the sensor along the vertical direction.

9. The oven appliance of claim 7, wherein the imperforate wall and the perforated wall are formed from a piece of sheet metal.

10. The oven appliance of claim 7, wherein the outer surface of the imperforate wall is aluminized.

11. The oven appliance of claim 7, wherein the broil heating element, the sensor and the sensor shield are mounted to a rear wall of the cooking chamber.

12. The oven appliance of claim 7, wherein the sensor shield comprises a side wall, an outer surface of the side wall facing the broil heating element, an inner surface of the side wall facing the sensor.

13. The oven appliance of claim 7, wherein the sensor is a temperature sensor or a humidity sensor.

* * * * *